(12) United States Patent
Chan et al.

(10) Patent No.: US 12,259,927 B1
(45) Date of Patent: Mar. 25, 2025

(54) INTENT GRAPH MODEL GENERATION USING DIFFERENCE INFORMATION

(71) Applicant: Juniper Networks, Inc., Sunnyvale, CA (US)

(72) Inventors: Chi Fung Michael Chan, Mountain View, CA (US); Nathaniel Scott Ray, Aliso Viejo, CA (US); Diheng Qu, Palo Alto, CA (US); Atul Bhaskarrao Patil, San Ramon, CA (US); Manish Kumar Mathukumilli, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 18/543,813

(22) Filed: Dec. 18, 2023

(51) Int. Cl.
*G06F 16/00* (2019.01)
*G06F 16/901* (2019.01)

(52) U.S. Cl.
CPC .............................. *G06F 16/9024* (2019.01)

(58) Field of Classification Search
CPC ..... G06F 1/00; G06F 3/00; G06F 5/00; G06F 7/00; G06F 8/00; G06F 9/00; G06F 11/00; G06F 12/00; G06F 13/00; G06F 15/00; G06F 16/00; G06F 17/00; G06F 18/00; G06F 21/00; G06F 30/00; G06F 40/00; G06F 40/30; G06F 3/167; G06F 3/017; G06F 3/013; G06F 3/011; G06F 40/205; G06F 40/40; G06F 7/14; G06F 40/274; G06F 16/243; G06F 16/248; G06F 40/56; G06F 40/284; G06F 40/216; G06F 40/126; G06F 40/242; G06F 9/54; G06F 40/247; G06F 16/21; G06F 17/15; G06F 18/217;

(Continued)

(56) References Cited

U.S. PATENT DOCUMENTS 10,200,248 B1  2/2019  Jiang et al.
10,516,761 B1  12/2019  A et al.
(Continued)

FOREIGN PATENT DOCUMENTS

EP   3989486 A1   4/2022

OTHER PUBLICATIONS

"Time Voyager", Juniper Networks, Inc., May 30, 2023, 5 pp.
(Continued)

*Primary Examiner* — Shyue Jiunn Hwa
(74) *Attorney, Agent, or Firm* — Shumaker & Sieffert, P.A.

(57) ABSTRACT

A system includes computer-readable media configured to store a plurality of objects representing intent graph models of a network, and processing circuitry coupled to the computer-readable media. The processing circuitry is configured to receive a request indicating a requested time, determine one or more first objects of the plurality of objects, the first objects storing an intent graph model associated with a first (Continued)

time, the first time different from the requested time, determine one or more second objects of the plurality of objects, the second objects storing difference information indicating one or more changes to the intent graph model associated with the first time that occurred after the first time, apply the changes to the intent graph model associated with the first time to generate an intent graph model associated with the requested time, and output an indication of the intent graph model associated with the requested time.

20 Claims, 7 Drawing Sheets

(58) Field of Classification Search
CPC ........ G06F 21/57; G06F 3/012; G06F 40/103; G06F 40/58; G06F 8/30; G06F 8/34; G06F 8/35; G06F 8/71; G06F 16/176; G06F 18/24; G06F 16/48; G06F 16/43; G06F 16/367; G06F 40/211; G06F 16/211; G06F 9/453; H04L 41/12; H04L 41/145; H04L 41/22; H04L 41/0806; H04L 41/0893; H04L 41/082; H04L 41/0894; H04L 41/40; H04L 41/0803; H04L 41/0866; H04L 41/0843; H04L 41/0853; H04L 41/0895
See application file for complete search history.

(56) References Cited

U.S. PATENT DOCUMENTS

2024/0095544 A1* 3/2024 Kahn .................. G06N 3/084
2024/0265210 A1* 8/2024 Rizk .................... G06F 40/35

OTHER PUBLICATIONS

Bjorklund, "Yang—A Data Modeling Language for the Network Configuration Protocol (NETCONF)," Internet Engineering Task Force, RFC 6020, Oct. 2010, 173 pp.
ENNS, "NETCONF Configuration Protocol," Network Working Group, RFC 4741, Dec. 2006, 96pp.
Harrington et al., "An Architecture for Describing Simple Network Management Protocol (SNMP) Management Frameworks," RFC 3411, Network Working Group, the Internet Engineering Task Force draft, Dec. 2002, 64 pp.
Extended Search Report from counterpart European Application No. 24157171.0 dated Jul. 26, 2024, 13 pp.
McNamara et al., "A mechanism for intent driven adaptive policy decision making", 2020 16th International Conference on Network and Service Management (CNSM), Nov. 2, 2020, 1-3 pp.
Wang et al., "Epinoia: Intent Checker for Stateful Networks", 2021 International Conference on Computer Communications and Networks (ICCCN), Jul. 19, 2021, 1-9 pp.
Zhang et al., "A conflict resolution scheme in intent-driven network", 2021 IEEE/CIC International Conference on Communications in China (ICCC), Jul. 28, 2021, 23-28 pp.

* cited by examiner

INTENT GRAPH MODEL GENERATION USING DIFFERENCE INFORMATION

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the client may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for storing and retrieval or a "replay" of intent graph models associated with a network over a period of time (e.g., weeks, months, or years). For example, a network management system (NMS), also referred to herein simply as a "system," may generate, using the intent graph models, a graphical user interface showing telemetry data for network devices of a network managed by the NMS. Storing the intent graph models may allow an administrator to review the telemetry data with richer data and/or may allow the NMS to automatically (e.g., without human interaction) identify network errors or faults, which may help to reduce an amount of time that a network experiences an outage.

In accordance with the techniques of the disclosure, the NMS may be configured to store difference information to record changes in an intent graph model. Difference information may be a small fraction of a size of a "snapshot" storing a complete set of data for an intent graph model, which may help to increase a period of time that intent graph models may be replayed compared to systems that only store snapshots of intent graph models.

Using difference information to generate an intent graph model for each particular time may substantially reduce a bandwidth and/or storage burden for recording the changes to the intent graph model, which may permit an increased number of intent graph models to be stored compared to systems that only rely on storage of complete snapshots of entire intent graph models. As used herein, bandwidth may refer to an amount of data transferred between memory and storage and/or between a device replaying intent graph models and another device storing the intent graph models.

With respect to a retrieval or replay of intent graph models, difference information may allow intent graph models to be loaded and/or presented with reduced bandwidth and memory requirements compared to systems that do not use difference information, which may reduce or eliminate delays in loading intent graph models for a period of time. For example, the system may replay network information (e.g., telemetry information) for an intent graph model by, for example, reproducing the intent graph model using data for a previous intent graph model already stored in memory and difference information representing changes to the previous intent graph model.

In one example, a system includes computer-readable media configured to store a plurality of objects representing a plurality of intent graph models of a network, and processing circuitry coupled to the computer-readable media, wherein the processing circuitry is configured to receive a request indicating an intent graph model associated with a requested time, determine one or more first objects of the plurality of objects, the one or more first objects storing an intent graph model associated with a first time, the first time different from the requested time, determine one or more second objects of the plurality of objects, the one or more second objects storing difference information indicating one or more changes to the intent graph model associated with the first time that occurred after the first time, apply the one or more changes to the intent graph model associated with the first time to generate an intent graph model associated with the requested time, and output an indication of the intent graph model associated with the requested time.

In another example, a method includes receiving, by processing circuitry, a request indicating an intent graph model associated with a requested time, determining, by the processing circuitry, one or more first objects of a plurality of objects, the one or more first objects storing an intent graph model associated with a first time, the first time different from the requested time, determining, by the processing circuitry, one or more second objects of the plurality of objects, the one or more second objects storing difference information indicating one or more changes to the intent graph model associated with the first time that occurred after the first time, applying, by the processing circuitry, the one or more changes to the intent graph model associated with the first time to generate an intent graph model associated with the requested time, and outputting, by the processing circuitry, an indication of the intent graph model associated with the requested time.

In another example, non-transitory computer-readable storage media stores instructions that, when executed, cause processing circuitry to receive a request indicating an intent graph model associated with a requested time, determine one or more first objects of a plurality of objects, the one or more first objects storing an intent graph model associated with a first time, the first time different from the requested time, determine one or more second objects of the plurality of objects, the one or more second objects storing difference information indicating one or more changes to the intent graph model associated with the first time that occurred after the first time, apply the one or more changes to the intent graph model associated with the first time to generate an intent graph model associated with the requested time, and output an indication of the intent graph model associated with the requested time.

The details of one or more examples are set forth in the accompanying drawings and the description below. Other features, objects, and advantages will be apparent from the description and drawings, and from the claims.

DETAILED DESCRIPTION

Figure 1:
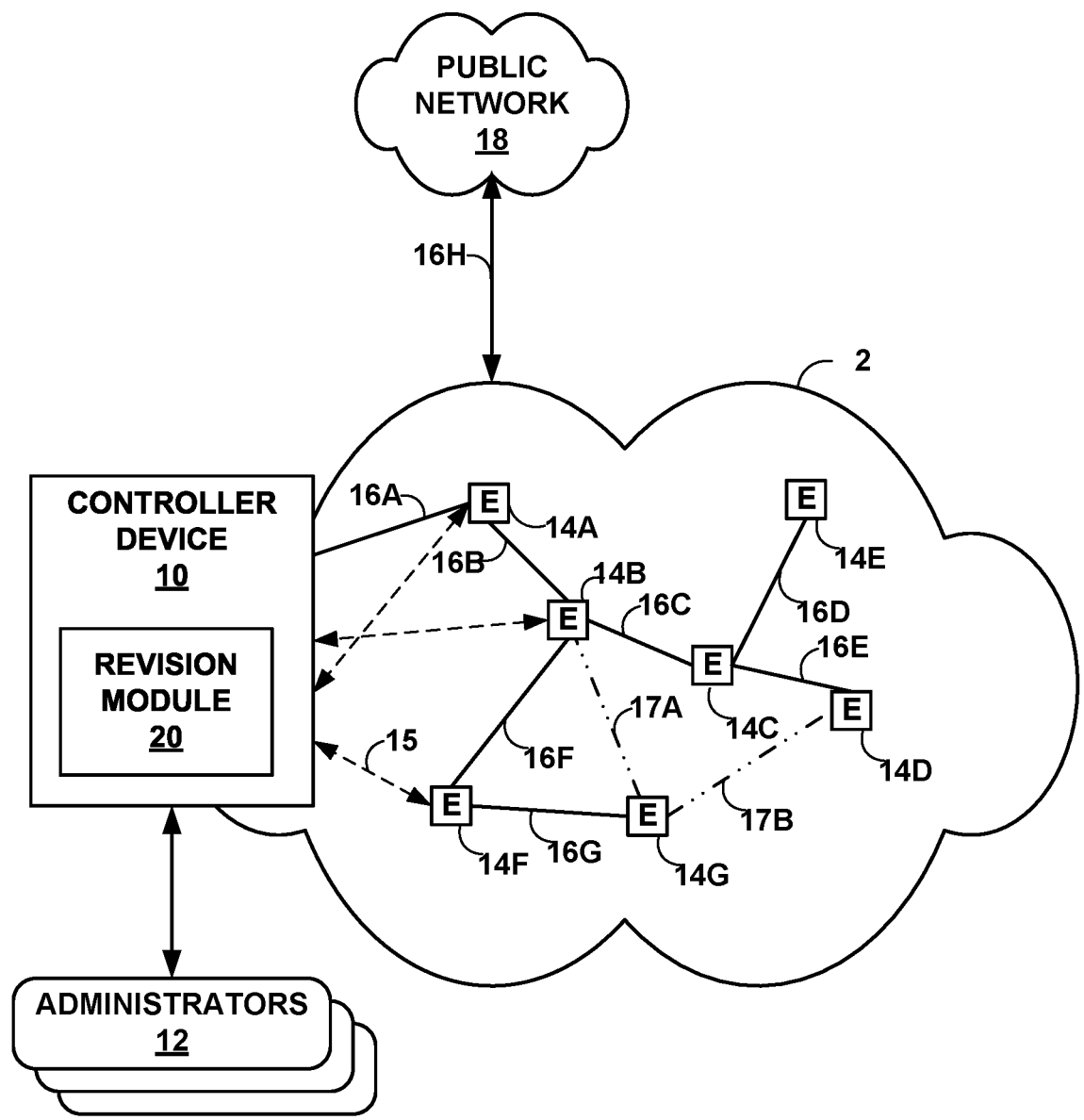
FIG. 1 is a block diagram illustrating an example including elements of an enterprise network that are managed using a controller device, according to techniques of this disclosure.

Some systems may store a complete intent graph model each time a change is made to the intent graph model for a network. In such systems, the addition of a single interface to an intent graph model results in storage of the entire intent graph model including the additional single interface, in addition to the entire intent graph model representing the network's previous state. In some examples, an intent graph model for a network may be over 2 gigabytes ("GBs"). In this example, even a single change, such the addition of a single network interface results in the entire 2 GB+ intent graph model being stored.

Storing an entire intent graph model for each change may result in high bandwidth requirements when storing and retrieving the intent graph model at a storage system (e.g., cloud storage) as well as a relatively large storage capacity requirements, which may result in high cost. To avoid these issues, some solutions rely upon limiting the number of intent graph models that may be stored and/or on long term storage of the intent graph models.

Some solutions may load an entire intent graph model each time a change, no matter how small (e.g., a change to a single interface amounting to 1 kilobyte ("kB") of data) is made to an intent graph model. Such systems also may accordingly rely on relatively high bandwidth and/or storage requirements, especially when retrieving multiple intent graph models and loading the intent graph models.

Reduction in resource requirements (e.g., bandwidth and storage requirements) for storage and retrieval of intent graph models can extend a period of time that the intent graph models are available to network administrators. For example, weeks, months, or years of intent graph models could be stored to help network administrators manage large networks. In addition, reducing resource requirements increases the speed at which intent graph models may be retrieved, allowing a plurality of intent graph models to be loaded quickly thereby reducing delay, increasing system responsiveness, and saving network administrators' time when replaying a state of a network (e.g., telemetry information).

The techniques described herein are directed to a system, such as for example a network management system (NMS), configured to record and/or represent intent graph models for a network using difference information, which may reduce an amount of bandwidth and storage used when storing and retrieving intent graph models. For example, rather than storing an entire intent graph model (e.g., a snapshot) for each change to applied to an intent graph model, an NMS may store difference information, representing one or more changes relative to a prior version of the intent graph model.

For example, at a first day of implementing network devices, such as at a datacenter, an NMS may store a snapshot of an entire intent graph model. On a subsequent second day, a network administrator may add a new rack (e.g., 40 servers, 2 new leaves, etc.). In this example, difference information representing the new rack, is stored rather than another snapshot of the entire intent graph model. The NMS may then generate an intent graph model for the second day using the first day snapshot and the second day difference information. As can be seen from this example, the resource requirements may be significantly reduced using difference information. For example, the snapshot may be over 2 GBs while difference information may be substantially less, such as less than 1 kB. The second day difference information can therefore be much more rapidly retrieved and loaded, such as to local storage, as compared to an entire intent graph model for the second day.

Network administrators may frequently change an intent graph model (e.g., dozens of daily changes). For example, network administrators may frequently add, update, and remove virtual networks in a datacenter. A virtual network (e.g., VLAN or VXLAN) may provide an abstraction of a local area network (LAN) including traffic endpoints across a routed datacenter network. The requirements for a virtual network may change frequently, and cause, for instance, expansion and contraction of the virtual network, such as through the addition and removal of virtual network elements, and the addition of additional switch interfaces within other virtual networks. Each change or small group of changes may result in an updated intent graph model. Network administrators may also frequently wish to retrieve multiple intent graph models as well, such as to "replay" the state of the network over time, such as for presentation and use in a graphical user interface. Such frequency of change and retrieval further exacerbates the high resource consumption and limitations of some solutions.

In accordance with the techniques disclosed herein, use of difference information may alleviate or eliminate limitations to a period of time intent graph models may be stored (e.g., weeks, months, years) even for intent graph models that experience frequent changes (e.g., dozens of daily changes). Additionally, network administrators may replay intent graph models more rapidly and with reduced delay in that difference information may be more quickly retrieved and loaded especially as compared to entire intent graph models.

FIG. 1 is a block diagram illustrating an example including elements of an enterprise network 2 that are managed using a controller device 10. Managed nodes or elements 14A-14G (collectively, "elements 14", "nodes 14", or "network devices 14") of enterprise network 2 include network devices interconnected via communication links 16, or edges 16, to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any discrete data unit defined by any protocol, such as, for example, Ethernet, a cell defined by the Asynchronous Transfer Mode (ATM) protocol, Transmission Control Protocol (TCP), or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link 16. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system or "system", although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

Controller device 10 may include a revision module 20 which may store and retrieve intent graph models (e.g., snapshots) and difference information. Revision module 20 may also generate and/or update intent graph models and difference information. In some examples, revision module 20 stores intent graph models currently deployed and/or previously deployed at elements 14. Referring to the example of FIG. 1 for instance, an intent graph model for network 2 may store elements or nodes 14 representing components of network 2 and communication links or edges 16 representing connections between nodes. An intent graph model may also include a representation of edges 16 between multiple networks, such as edge 16H shown connected to public network 18.

Revision module 20 may generate an intent graph model and store a snapshot of the intent graph model. As used herein, a snapshot of an intent graph model may include all the data (e.g., a state for each interface) for the intent graph model. In some examples, revision module 20 may store difference information for one or more changes to an intent graph model without some data stored by a snapshot. For example, revision module 20 may store difference information for a current intent graph model without data that remains constant to data stored by an intent graph model that was deployed at elements 14 immediately before the intent graph model. For example, revision module 20 may store a snapshot for an intent graph model representing a complete state of network 2, which includes a representation of nodes 14, and edges 16 thereof. If a change to the intent graph model is provided by administrators 12, for example, by deleting edge 16G, revision module 20 may store difference information for the change to indicate the deletion of edge 16G without information about nodes 14, and edges 16A-16F.

Revision module 20 may retrieve the snapshot and the difference information including the deletion. Revision module 20 may apply the difference information (e.g., deletion of edge 16G) to the snapshot to generate an intent graph model reflecting network 2 after the deletion of edge 16G (e.g., network 2 without edge 16G). While this example is directed to deleting edges, revision module 20 may store difference information related to components other than edges (e.g., interfaces) and/or changes different than deleting (e.g., adding and/or modifying existing components).

For example, in response to network 2 being updated from a first intent graph model, for example, by adding edge 17A, revision module 20 may generate difference information associated with the addition of edge 17A for a second intent graph model. Revision module 20 may retrieve the snapshot for the first intent graph model and the difference information for the second intent graph model including the addition of edge 17A to generate the second intent graph model reflecting network 2 after the addition of edge 17A.

Revision module 20 may generate intent graph models over a period of time to replay network 2. For example, at a first time, revision module 20 may retrieve a snapshot of an intent graph model representing network 2 at the first time. Revision module 20 may retrieve difference information at a second time (e.g., the deletion of edge 16G) and apply this difference information to generate an intent graph model representing network 2 at the second time. In this example, revision module 20 may retrieve difference information at a third time (e.g., the addition of edge 17A) and apply this difference information to generate an intent graph model representing network 2 at the third time.

Configuring revision module 20 to use difference information may help to reduce bandwidth requirements of revision module 20 compared to systems that only store intent graph models using a complete state (e.g., snapshots). Moreover, configuring revision module 20 to use difference information may reduce a time for revision module 20 to retrieve data compared to systems that only retrieve snapshots of entire intent graph models. For example, a snapshot may be over 2 GBs while difference information may be less than 1 kilobyte (KB).

Again, though described above with respect to particular examples, a variety of changes to network 2 may be stored as difference information, including addition, replacement, removal, modification to one or more nodes 14 or edges 16 of network 2, including changes to hardware and/or software versions, capabilities, or configurations.

After loading a snapshot of an intent graph model into memory, revision module 20 may obtain difference information to reflect changes to network 2 from the snapshot. For example, to determine the intent graph model for a particular time (e.g., $t_n$), revision module 20 may load a snapshot of the intent graph model at a time before the particular time (e.g., $t_0$). Continuing this example, revision module 20 may apply the one or more changes to the intent graph model that occurred after the snapshot at $t_0$ until the particular time (e.g., $t_1, t_2, t_3, t_4, \ldots, t_n$), by only loading the corresponding difference information. To achieve a replay of network 2 for an administrator 12, revision module 20 may sequentially apply difference information and present the resulting intent graph model at times $t_1$, $t_2$, $t_3$, and so on.

In this manner, a single snapshot of an intent graph model, which may already be locally stored for example, in memory (e.g., a cache or a short-term storage of controller device 10), may be used to represent network 2 at one or many times by loading difference information for those times. Configuring revision module 20 to re-use a snapshot already stored in memory and to apply difference information for determining an intent graph model may reduce the amount of data downloaded by controller device 10 from a data store (e.g., a cloud-based data store, a data store at another device, or a long-term storage component of controller device 10) compared to systems always retrieve a complete state of the intent graph model. For example, using difference information instead of a snapshot may reduce an amount of data downloaded by controller device 10 from GBs to 10 s of kBs and/or may reduce the amount of time required to replay a network (e.g., 30 seconds instead of 5 minutes).

In some examples, administrator 12 uses controller device 10 or a local workstation to interact directly with elements 14 (e.g., through telnet, secure shell (SSH), or other such communication sessions). That is, elements 14 generally provide interfaces for direct interaction, such as command line interfaces (CLIs), web-based interfaces, graphical user interfaces (GUIs), or the like, by which a user can interact with the devices to directly issue text-based commands. Examples of interfaces using text-based commands may include one or more of NX-API™, Arista EOS™, Juniper Telemetry Interface™, and gNMI telemetry collection interface. For example, these interfaces typically allow a user to interact directly with the device (e.g., through a telnet, secure shell (SSH), hypertext transfer protocol (HTTP), or other network session) to enter text in accordance with a defined syntax to submit commands to the managed element. In some examples, the user initiates an SSH session 15 with one of elements 14 (e.g., element 14F) using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to (e.g., extensible markup language (XML)) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741 December 2006, available at tools.ietf.org/html/rfc4741, the entire contents of which are incorporated herein by reference. Controller device 10 may establish NETCONF sessions with one or more of elements 14.

A user "intent" may represent a single source of truth, from which device configurations are derived. An intent-based networking system may help to allow administrators to describe the intended network/compute/storage state. Intents may represent a state and may be persisted across system restarts so the user does not lose the source of truth for their network's management and operation. For example, suppose the intent starts with a network topology definition with servers connected to leaf switches, where the servers host user workloads. In this example, traffic between the servers could vary over time and/or hotspots could develop in the network. For instance, a workload could be deployed on two different racks of servers causing the traffic between the communicating processes to traverse an oversubscribed fabric. Telemetry may be used to detect the oversubscription and the workload distribution may then be updated so that endpoints get moved to the same rack, hence minimizing the use of oversubscribed links in the fabric. In this example, the intent could be modeling the policy of how widely distributed (e.g., how many racks) a workload's endpoint could be spread across, and/or how much fabric links are supposed to be used by this workload. In this way, the policy could be updated based on the current network state.

Intents may be represented as data models, such as intent graph models, which may be modeled using unified graphs. Intent graph models may be represented as connected graphs, so that business policies can be implemented across intent graph models. For example, intent graph models may be represented using connected graphs having vertices connected with has-edges and reference (ref) edges. Controller devices 10 may model intent graph models as unified graphs, so that the intent graph models can be represented as connected. In this manner, business policies can be implemented across intent graph models. When intents are modeled using a unified intent graph model, extending new intent support needs to extend the intent graph model and compilation logic.

Controller device 10 may be configured to accept high-level configuration data, or intents, from administrator 12 (which may be expressed as structured input parameters (e.g., according to YANG which is described in Bjorklund, "YANG—A Data Modeling Language for the Network Configuration Protocol (NETCONF)," Internet Engineering Task Force, RFC 620 October 2010, available at tools.ietf.org/html/rfc6020)).

In order to configure devices to perform the intents, a user (such as an administrator 12) may write translation programs that translate high-level configuration instructions (e.g., instructions according to an intent graph model, which may be expressed as a unified graph model) to low-level configuration instructions (e.g., instructions according to a device configuration model). As part of configuration service support, administrator 12 may provide the intent graph model and a mapping between the intent graph model to a device configuration model.

Controller device 10 may be configured to output respective sets of low-level device configuration data (e.g., device configuration additions, modifications, and removals). Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent graph model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent graph model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with the techniques of the disclosure, in addition to replaying intent graph models, controller device 10 may be configured to replay historical metrics for network devices 14 relative to one or more intent graph models. For example, controller device 10 may receive a query indicating a time and, optionally, a network service managed by controller device 10. For instance, controller device 10 may receive the query from administrator 12 indicating a time (e.g., 6 PM Friday to 6 AM Saturday) for which the administrator is interested in understanding the state of the network. The time indicated in the query may be a single point in time, or a time range. In this example, controller device 10 may select an intent graph, from a plurality of intent graphs for network 2, that is associated with a time range that includes the time indicated by the query. For example, the controller device 10 may select an intent graph that was implemented by controller device 10 at the time indicated by the query (e.g., at 6 PM Friday). In some examples, each intent graph of the plurality of intent graphs includes nodes representing components of network 2 and edges representing connections between the nodes and each intent graph of the plurality of intent graphs is associated with a corresponding different time range (e.g., a first intent graph is from 6 PM Monday to 3 PM Wednesday and a second intent graph is from 3 PM Wednesday to 5 PM Friday). In some examples, the different time ranges are non-overlapping time ranges, in which any given time is included in only a single time range, and thus is associated with only a single intent graph. In some examples, if the time range spans over two intent graphs, controller device 10 may select a first intent model that was implemented at the beginning of the time range. In this example, controller device 10 may select a second intent model that was implemented at a time during the time range when the first intent model was changed to the second intent model.

Controller device 10 may determine a subset of telemetry data, from a database of telemetry data received from a set of network devices of network 2 over the time period that corresponds to the time range using the time indicated by the query and the network service indicated by the query. For example, controller device 10 may determine telemetry data measured by network devices 14 while controller device 10 implemented the selected graph model and at the time indicated by the query.

Controller device 10 may perform a network analysis operation using the selected intent graph and the subset of the telemetry data to generate one or more metrics. The selected intent graph may indicate an intended or desired state of a network, while the telemetry data indicates the actual state of the network in operation at one or more times. For example, controller device 10 may output the selected intent and the subset of telemetry data to a root cause fault engine (e.g., included in controller device 10 or outside of controller device 10) and the root cause fault engine outputs the one or more metrics as, for example, one or more candidate root cause faults. A root cause fault may refer to one or more issues that cause symptoms and impacts. Symptoms may be observable (e.g., using device telemetry) and may be used to match root cause faults. Impacts may refer to causal consequences of root cause faults but may not be observable. For example, a root cause fault may be a link being down (e.g., a cable is broken). In this example, symptoms may include telemetry data indicating, for example, interfaces on both ends of a link being operationally down and/or no neighbor reported for both interfaces and the impact may include degraded network bandwidth for services whose traffic could have used the down link. In some examples, the selected intent may be an intent graph model generated using difference information as described herein.

In some examples, controller device 10 may output the selected intent and the subset of telemetry data to an analytics engine and the analytics engine outputs the one or more metrics as, for example, one or more of an intent-based analytics alert, an average alignment of errors per second for a network device 14A, an average Frame Check Sequence (FCS) errors per second for network device 14A, an average number of received bits per second for network device 14A, or an average transmitted bits per second for network device 14A.

Controller device 10 may output an indication of the one or more metrics. For example, controller device 10 may generate data representing a user interface presenting the one or more metrics and output, for display, the data representing the user interface. As another example, controller device 10 may output the indication of the one or more metrics as a text message or email to the administrator. In this way, administrator 12 may review the one or more metrics (e.g., displayed in a user interface) to help to identify root cause faults (RCFs) of hardware components and/or software components of network 2.

Figure 2:
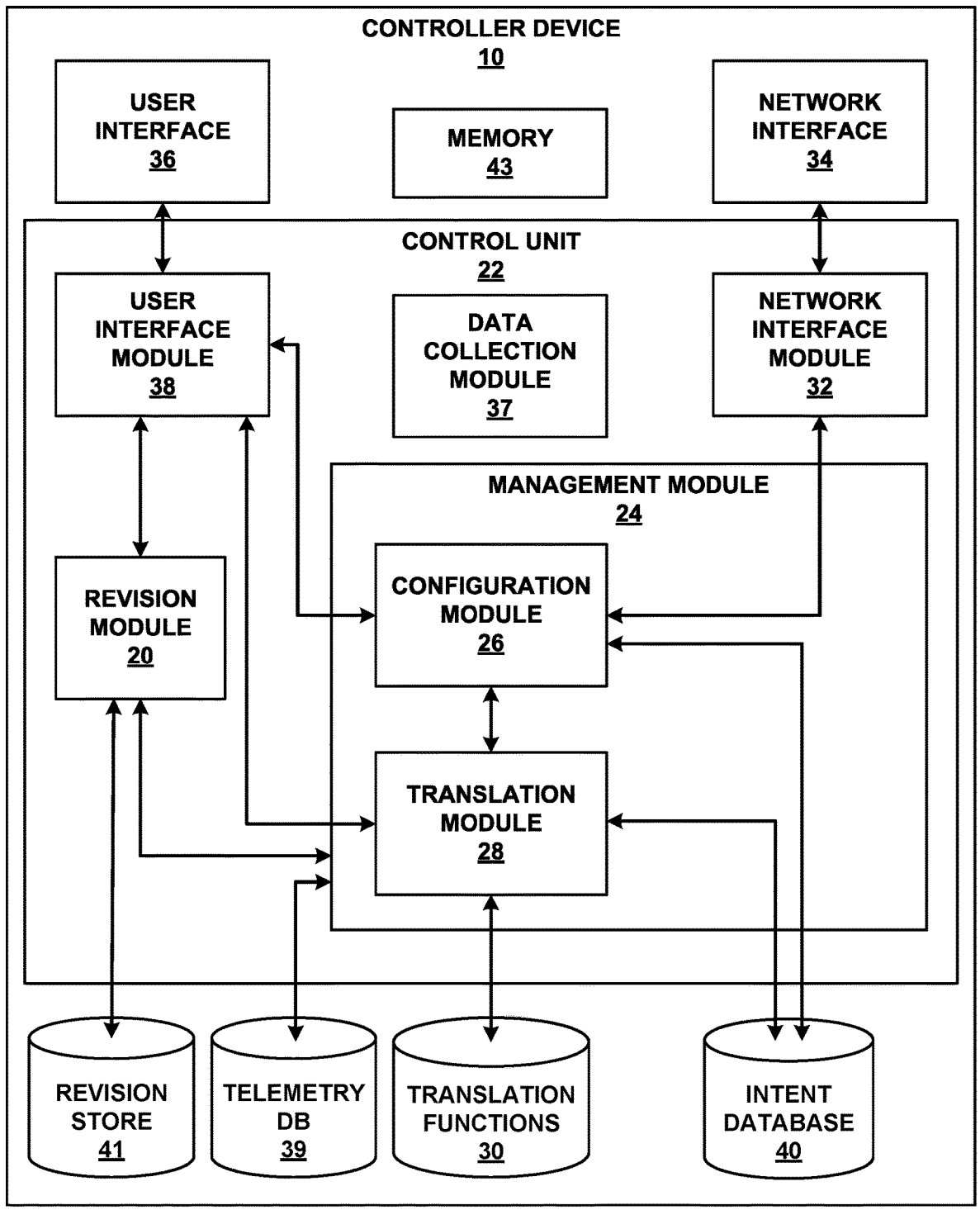
FIG. 2 is a block diagram illustrating an example set of components for the controller device of FIG. 1, according to techniques of this disclosure.

FIG. 2 is a block diagram illustrating an example set of components for controller device 10 of FIG. 1. In this example, controller device 10 includes control unit 22, network interface 34, user interface 36, and memory 43. Network interface 34 represents an example interface that can communicatively couple controller device 10 to an external device (e.g., one of elements 14 of FIG. 1). Network interface 34 may represent a wireless and/or wired interface (e.g., an Ethernet interface or a wireless radio configured to communicate according to a wireless standard, such as one or more of the IEEE 802.11 wireless networking protocols (such as 802.11 a/b/g/n or other such wireless protocols)). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10 (e.g., to provide input and receive output). For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely (e.g., via network interface 34).

In this example, control unit 22 includes user interface module 38, network interface module 32, management module 24, and revision module 20. Control unit 22 executes user interface module 38 to receive input from and/or provide output to user interface 36. For example, user interface module 38 may output one or more intent graph models generated by revision module 20 to user interface 36, such as for presentation (e.g., replay) to a user. User interface module 38 may output difference information for presentation as well.

User interface module 38 may receive input indicating a user request for an intent graph model via user interface 36. For example, user interface module 38 may receive a requested time from a user via user interface 36. Revision module 20 may retrieve a snapshot, difference information, or both for the requested time to generate the intent graph model for the requested time.

Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices (e.g., elements 14 of FIG. 1). Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions (e.g., to add new services, remove existing services, or modify existing services performed by the managed devices). The intents may be structured according to, e.g., YANG. In some examples, management module 24 also provides the user with the ability to submit translation functions that translation module 28 executes to transform intents to device-specific, low-level configuration instructions, as discussed below.

Memory 43 may include a computer-readable media used to store or cache snapshots of entire intent graph models and/or difference information. Revision store 41 may retrieve a snapshot a single time and the snapshot may be used repeatedly to generate a plurality of intent graph models by applying difference information of various time periods to a cached snapshot (e.g., stored in memory 43). In some examples, memory 43 may be local to controller device 10, such as shown in the example of FIG. 2. In other examples, memory 43 may be local memory at a network administrator's computing device (e.g., a network administrator's local workstation).

Revision module 20 may use revision store 41 in lieu of intent database 40. For example, revision module 20 may use revision store 41 to store and/or retrieve past and/or present intent graph models. In some examples, revision module 20 may use revision store 41 in conjunction with intent database 40. For example, intent database 40 may store a few intent graph models (e.g., 5) that may allow an administrator to automatically restore an intent graph model previously deployed to elements, while revision store 41 stores many intent graph models for a replay of telemetry data for elements 14 for a relatively large time period (e.g., weeks, months, or years). That is, revision store 41 and intent database 40 may serve distinct purposes in some examples. For example, revision store 41 may be used for storage and replay of a state of network 2 (e.g., diagnosis and analysis), while intent database 40 may be used to apply intent graph models to configure network 2 (e.g., deployment).

Intent database 40 may include a data structure describing a configuration of managed network devices (e.g., network elements 14). For example, intent database 40 may include information indicating device identifiers (such as MAC and/or IP addresses), device type, device vendor, devices species (e.g., router, switch, bridge, hub, etc.), or the like. Intent database 40 may store current configuration information (e.g., intent graph model, or in some cases, both intent graph model and low-level configuration information) for the managed devices (e.g., network elements 14). Intent database 40 may include a database that comprises a unified intent graph model. As described above, controller device 10 may use revision store 41 along with or in lieu of intent database 40. In this example, intent database 40 may store at least an intent graph model currently deployed at network elements 14 and zero or more (e.g., 5) intent graph models previously deployed at network elements 14. In examples where revision store 41 is used in lieu of intent database 40, revision store 41 may store at least one (e.g., 100s, 1000s) intent graph model previously deployed at network elements 14 and may optionally store an intent graph model currently deployed at network elements 14. For example, revision store 41 may store at least one intent graph model as a snapshot and at least one intent graph model using difference information.

Data collection module 37, which may comprise a writer and/or a reader, may be configured to receive telemetry data. For example, data collection module 37 may receive telemetry data from elements 14, from a set of sensor devices associated therewith, or both. Telemetry database 39 may store telemetry data for network 2 and associate the telemetry data with a time. For example, controller device 10 may store a snapshot for a first time (T1) and may store only changes in event driven data between T1 and a third time (T3).

Management module 24 may maintain a data structure in intent database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using intent database 40. Translation module 28 determines which of translation functions 30 to execute on the high-level configuration instructions based on the information of intent database 40 (e.g., which of the devices are to receive the low-level configuration instructions). Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example of allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Control unit 22 executes revision module 20 to store and retrieve intent graph models and difference information. Control unit 22 may also execute revision module 20 to generate and update intent graph models and difference information.

Revision module 20 may receive an intent graph, such as in the form of an intent graph model or intent graph model from various sources. In some examples, revision module 20 may receive an intent graph model from intent database 40 or management module 24 and store a snapshot thereof. In other examples, revision module 20 may receive a user intent, such as from user interface module, and generate and store an intent graph model generated based on the user intent.

Revision module 20 may generate difference information by comparing intent graph models and determining the differences or changes therebetween. Difference information may include one or more differences or changes from an instant intent graph model to a previous intent graph model that is deployed at elements 14 immediately prior to the instant intent graph model. For example, revision module 20 may receive a first intent graph model and a second intent graph model from management module 24 and determine one or more changes (e.g., changes to network interfaces) that occurred in the second intent graph model relative to the first intent graph model. Revision module 20 may determine the one or more changes or differences by, for example, applying various "diff" or difference techniques, including determination of shared portions of data between the intent graph models to identify differences or changes between the intent graph models.

For example, revision module 20 may generate the difference information to identify one or more of an addition, a deletion, or a modification to a network state (e.g., an interface) from a previous intent graph model to an instant intent graph model. In this example, revision module 20 may apply the one or more changes specified in the difference information to the previous intent graph model to determine the instant intent graph model. Revision module 20 may determine the previous intent graph model using a snapshot for the previous intent graph model and/or using difference information for the previous intent graph model.

Components, physical or virtual, of intent graph models may be organized into various categories or groupings when storing an intent graph model. For example, an intent graph model may contain system information describing nodes 14 in network 2, interface information describing network interfaces in network 2, and link information describing edges 16 in network 2. The system, interface, link, or other information categories may describe the associated elements of intent graph models themselves, and may describe or include configurations, settings, capabilities, and other characteristics thereof.

A category or grouping of relationship information may also be provided to describe relationships between the system, interface, and link information as well as other information. For example, hosted interface information may match nodes 14 in the system information with one or more interfaces in the interface information that the nodes host, while link relationship information may match the one or more interfaces with one or more links in the link information.

Revision module 20 may operate on a category basis when applying one or more changes specified by difference information. For example, to determine a state of system information for a particular intent graph model, revision module 20 may retrieve a complete state of system information for a previous intent graph model, update, using difference information, data from the previous intent graph model to include every change (e.g., addition, modification, and/or deletion) to the system information between when the previous intent graph model and the particular intent graph model. While the above example used system information, revision module 20 may additionally, and/or alternatively, perform similar functions to other categories of information.

In some examples, one or more database tables, structured data files, or other objects may be provided to store changes. For example, a system table, an interface table, and a link table may each store corresponding system, interface, and link information while a hosted interface table and link relationship table respectively store hosted interface information and link relationship information.

An example of a table for interface information, for instance, is provided in Table 1 below.

TABLE 1

| Interface Name | IPV4 Address | IPV6 Address |
|---|---|---|
| xe0/0/0 | 10.0.0.1/32 | fec0::0/64 |
| et0/1/1 | 10.1.2.3/31 | fec0::3/64 |

Revision module 20 may store changes in a table, structured data file, or other object (e.g., an update table may store additions or modifications and a delete table may store deletions, or a combined table may store both additions or modification and deletions). To apply one or more changes, revision module 20 may upsert one or more rows as identified in an update table and delete one or more rows as identified in a delete table in sequence. For example, revision module 20 may apply difference information to interface information (when generating an intent graph model) by upserting one or more rows as identified in an update table to the interface table and/or deleting one or more rows as identified in a delete table from the interface table.

With respect to the example interface information of Table 1 for instance, difference information may specify deletion of interface et0/1/1. Continuing this example, difference information may specify an update to the IPV4 and/or IPV6 address of interface xe0/0/0. Revision module 20 may apply the difference information resulting in, for this example, a delete of interface et0/1/1 and an update (e.g., upsert) to the IPV4 and/or IPV6 address for interface xe0/0/0. Revision module 20 may also apply difference information specifying an addition of an interface. For example, revision module 20 may apply difference information specifying the addition of interface xe0/0/1 with an IPV4 address of 10.0.0.2/32 and an IPV6 address of fec0::1/64 to add or insert interface xe0/0/1 to the example interface information of Table 1.

As used herein, a snapshot may include a complete state (e.g., both information indicating changes from a reference or previous intent graph model and information that has not changed from the reference or previous intent graph model) of each category of information used for reproducing an intent graph model. In some examples, a snapshot represents data for an initial intent graph model applied to network 2, however, in other examples, a snapshot may represent data for an intent graph model applied to network 2 after the initial intent graph. A snapshot may include one or more of system information, interface information, link information, hosted interface information, or link relationship information.

Difference information may include a "diff" or differences between intent graph models as a whole or between individual categories of information for an intent graph model. For example, revision module 20 may generate difference information to include differences between two intent graph models as a whole (e.g., each category of information for an intent graph model). Revision module 20 may generate the difference information to include differences between information in a particular category of information. For example, revision module 20 may generate difference information to include an object including differences of a state between units of system information without data from other categories. In some examples, revision module 20 may generate difference information to include an object including differences of a state between elements of interface information without data from other categories.

Configuring revision module 20 to generate objects for difference information that represents differences between individual categories of information may help to increase granularity and/or specificity relative to identifying changes to network 2 compared to systems that only use a single object for difference information, which may help to reduce an amount of bandwidth consumed to determine an intent graph model. For example, difference information comprising differences between first link relationship information and second link relationship information may readily identify changes to edges 16 between nodes 14. In some examples, a change to a node 14 or interface configuration may only result in difference information representing changes between system information or interface information, respectively speaking.

In operation, revision module 20 may determine differences between individual categories of information by, for example, applying one or more difference techniques to units of information within such categories. For example, revision module 20 may perform a difference technique on system information of a first time and the system information at a second time after one or more system changes have occurred to generate difference information for the system information. Revision module 20 may similarly perform the difference technique on other categories of information at the second time as well to generate difference information for these categories thereby capturing all changes since the first time and at or before the second time.

Revision module 20 may store a snapshot of an entire intent graph model in revision store 41 using one or more objects. For instance, revision module 20 may store a snapshot of the intent graph model as an object specifying a complete state for interface information for the intent graph model and an object of system information specifying a complete state for the intent graph model. In some examples, revision module 20 may store difference information in revision store 41 using one or more objects. For instance, revision module 20 may store difference information for the intent graph model as an object specifying one or more changes for interface information for the intent graph model and an object of system information specifying one or more changes for the intent graph model.

Figure 3:
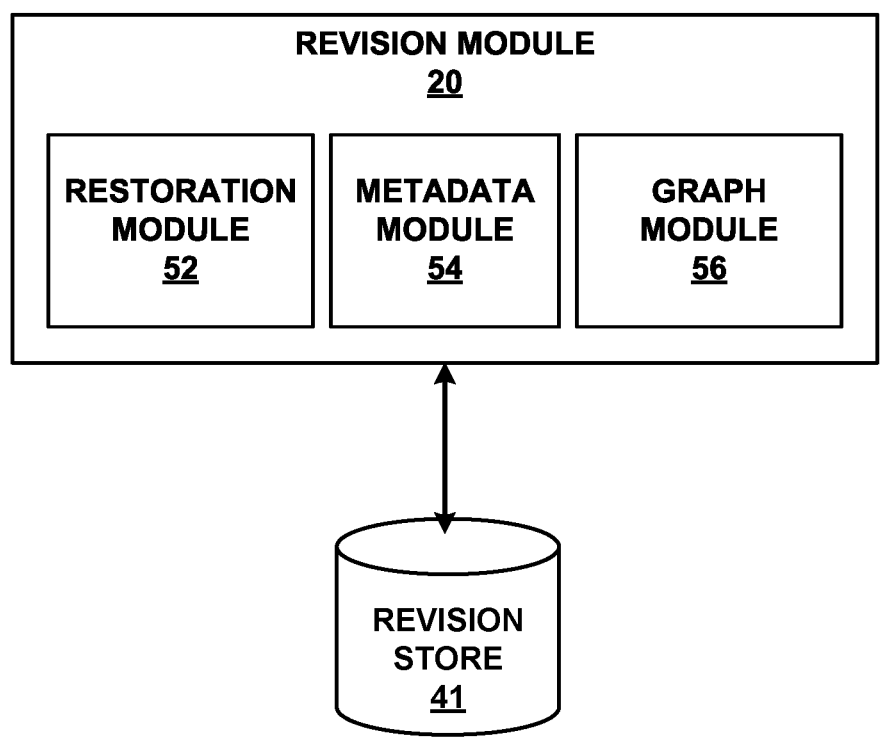
FIG. 3 is a block diagram illustrating an example set of components for a revision module, according to techniques of this disclosure.

FIG. 3 is a block diagram illustrating an example set of components for a revision module 20, according to techniques of this disclosure. In the example of FIG. 3, revision module 20 includes graph module 56, metadata module 54, and restoration module 52, which may provide various aspects and features of revision module 20 as disclosed herein.

Graph module 56 may perform one or more difference techniques to generate difference information. Graph module 56 may apply difference information to generate an intent graph model, such as for replay purposes. Graph module 56 may store one or more objects to revision storage 41 and/or retrieve the one or more objects from revision storage 41. In some examples, graph module 56 may receive an indication of a change to an intent graph model and store difference information in response to the indication.

Metadata module 54 may store and/or retrieve metadata for difference information. Metadata may include, for example, a time a unit of difference information was created along with a message or description of the difference information that may be received from a user. For example, administrator 12 may input a message describing the change to intent that resulted in the one or more changes recorded in the difference information. Metadata may include retention information indicating when, if ever, the difference information may be deleted.

Metadata module 54 may store metadata along with or independent of difference information, such as in an object. Metadata module 54 may also retrieve metadata along with or independent of difference information. For example, metadata module 54 may retrieve a time and/or description for one or more changes in a unit of difference information, such as for presentation via user interface 36. In some examples, metadata module 54 may retrieve a time and/or description for a period of time and output the time and/or description for display to administrator 12, such as by generating data to present at user interface 36.

Restoration module 52 may restore network 2 to an earlier intent such as to undo any changes with undesired or unintended results. For example, restoration module 52 may generate an intent graph model representing an earlier state of network 2. Restoration module 52 may identify the difference information representing the earlier state, such as by time, and apply the difference information to an immediately preceding snapshot to generate such intent graph model. Once generated, revision module 20 may communicate the intent graph model to management module 24, which may then deploy the intent graph model to restore network 2 to the earlier state.

Figure 4:
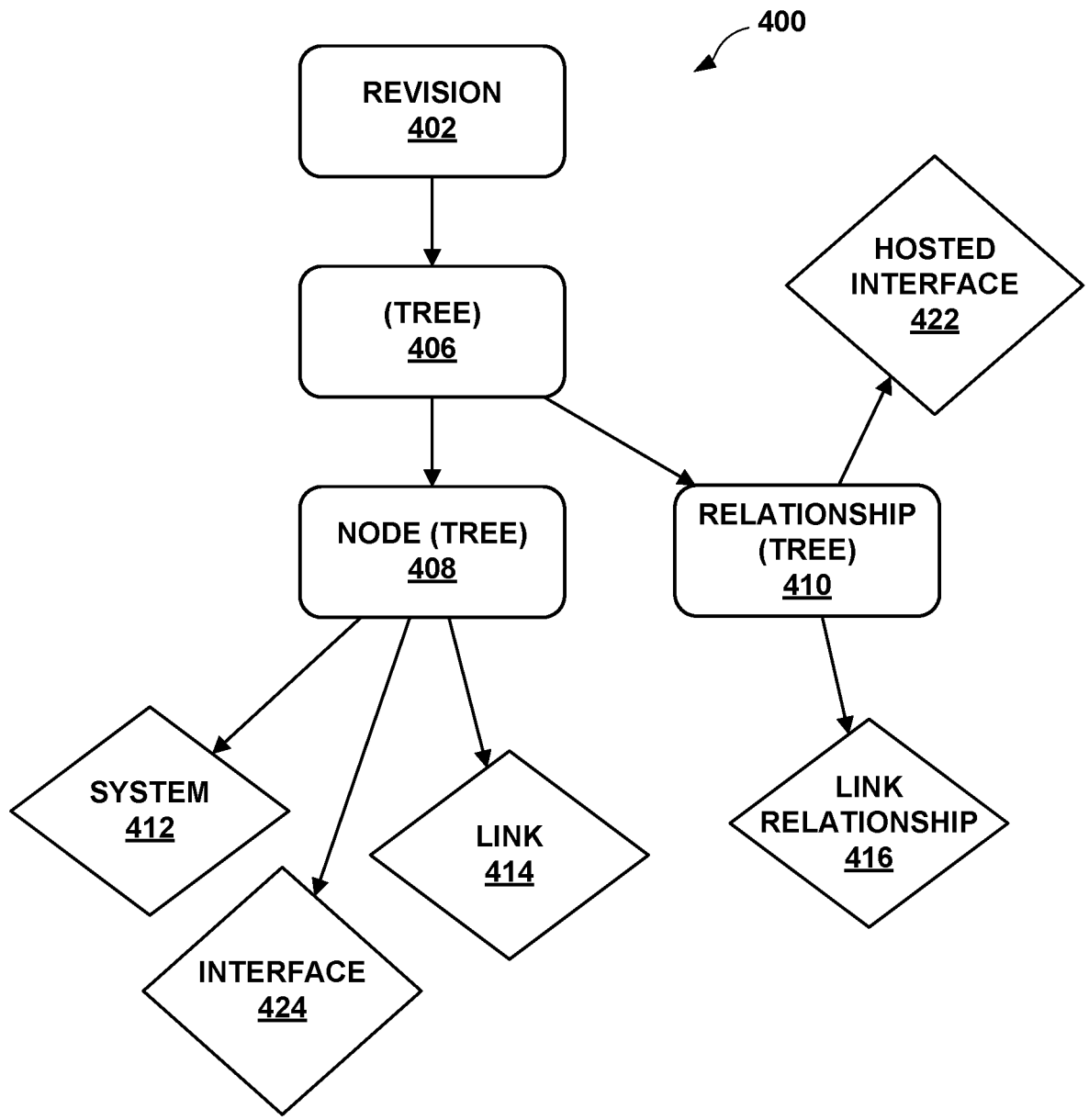
FIG. 4 is a block diagram illustrating example tree information, according to techniques of this disclosure.

FIG. 4 is a block diagram illustrating example tree information 400, according to techniques of this disclosure. Tree information 400 may include one or more elements connected by one or more pointers, such as the arrows shown in the example of FIG. 4. Though illustrated as a unidirectional arrow, a pointer may provide a unidirectional or bidirectional reference in various examples. In this example, tree information 400 includes a revision object 402. Revision object 402 may identify a revision value and/or version of an intent graph model. For example, revision object 402 may be "revision object 100" to indicate the $100^{th}$ revision to the intent graph model.

In some examples, revision object 402 may include an identifier, message, or other information. To illustrate, revision object 402 may include an identifier that uniquely identifies tree information 400, including a group of one or more objects therein, such as for retrieval purposes. In some examples, an identifier may include a hash value (e.g., a hash of one or more elements of object 400), an indexing value, or the like. For instance, the identifier may be an indexing value or string such as for example "0CFA". A message of revision object 402 may, for example, describe tree information 400 as may be received from administrator 12 via user interface 36. For instance, a message may include a timestamp, such as a time when tree information 400 was created (e.g., when administrator 12 submitted a change request to generate the intent graph model) and/or a description of the changes in tree information 400.

In some examples, tree element 406 includes information representing components of network 2 in one or more branches and leaves. In some examples, elements of tree information 400 may be stored as individual units at one or more locations (e.g., folders or directories) of a storage device and pointers may be used to link and locate the elements for retrieval.

Tree information 400 and/or tree element 406 may utilize pointers and/or references to other elements, as shown by the arrow lines in the example of FIG. 4. For example, revision module 20 may receive a selection of a revision object 402, such as through user interface 36, and utilize pointer from revision object 402 to find a system object 412 or other object of tree information 400. Revision module 20 may recursively follow pointers to retrieve each element of tree information 400.

In the example of FIG. 4, tree element 406 includes branches (e.g., node element 408 and relationship element 410) and leaves (e.g., system object 412, interface object 424, link object 414, hosted interface object 422, and link relationship object 416). Branches of tree element 406 may be trees themselves. For example, node element 408 and relationship element 410 are illustrated as trees with system object 412, interface object 424, link object 414, hosted interface object 422, and link relationship object 416 being leaves thereof.

Node element 408 may describe one or more nodes 14 in an intent graph model for network 2. For example, node element 408 includes system object 412 describing one or more nodes 14 (e.g., system information), interface object 424 describing one or more interfaces (e.g., interface information), and link object 414 describing one or more edges 16 (e.g., link information). Continuing the example, relationship object 410 includes hosted interface object 422 describing one or more interfaces hosted at one or more nodes 14 (e.g., hosted interface information), and link relationship object 416 describing one or more edges 16 connecting one or more nodes 14 (e.g., link relationship information). Though described with respect to particular categories of information, tree information 400 may include objects with various individual categories of information disclosed herein, or combinations thereof.

Figure 5:
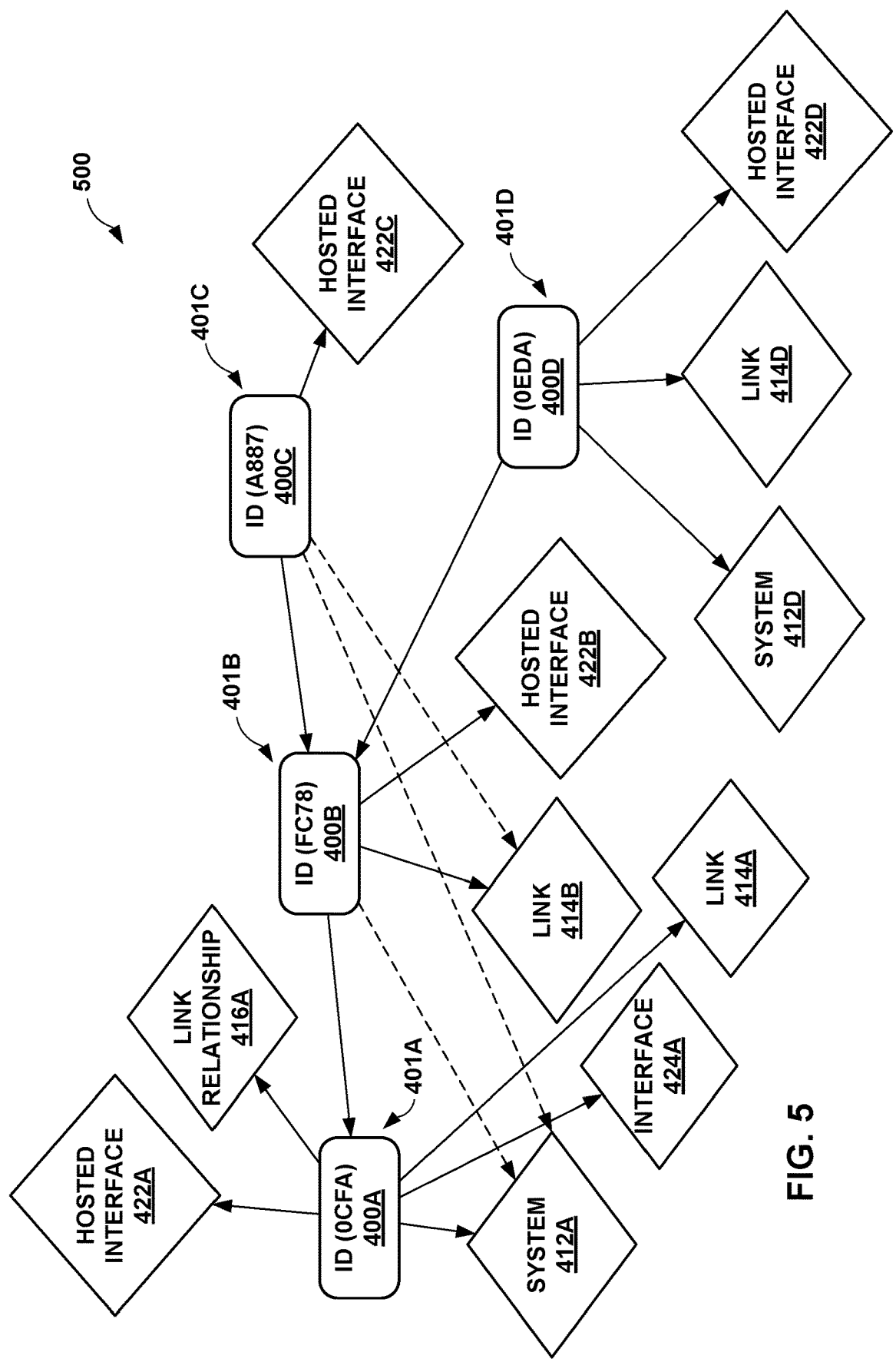
FIG. 5 is a block diagram illustrating example repository, according to techniques of this disclosure.

FIG. 5 is a block diagram illustrating an example repository 500, according to techniques of this disclosure. In some examples, repository 500 may represent one or more or all intent graph models 401 for network 2. As shown by the example of FIG. 5, repository 500 may include tree information 400A-400D. In the example of FIG. 5, certain elements of tree information 400 described with respect to FIG. 4 are not shown for clarity. Tree information 400 may represent individual snapshots or units of difference information and the recordation or storage thereof. Repository 500 may include one or more units of tree information 400A-400D interconnected with one or more pointers or references.

Revision store 41 may store repository 500 in a database and/or in one or more files in a file system. As shown in the example of FIG. 5, one or more pointers may be used to connect tree information 400 and elements thereof. As noted above, a pointer may provide a unidirectional or bidirectional reference in various examples. In the example of FIG. 5, as indicated by the interconnecting pointers, intent graph model 401A ("0CFA") is the parent of intent graph model 401B ("FC78"), which is the parent of both intent graph model 401C ("A887") and intent graph model 401D ("0EDA"). In general, tree information 400A may have more than one child representing non-linear changes to a network. In some examples, however, tree information 400 may be linear.

In the example of FIG. 5, tree information 400A for intent graph model 401A with an identifier of ("0CFA") specifies system object 412A, link object 414A, interface object 424A, link relationship object 416A, and hosted interface object 422A that represent a snapshot of intent graph model 401A. As shown, tree information 400A, in this example, is the ultimate parent or root of tree information 400B, 400C, and 400D in that tree information 400B, 400C, and 400D have one or more pointers that lead to tree information 400A. In the example of FIG. 5, tree information 400B, 400C, and 400D represent difference information and contain one or more changes to the snapshot of tree information 400A and the system object 412A, link object 414A, interface object 424A, link relationship object 416A, and hosted interface object 422A thereof.

In the example of FIG. 5, tree information 400A includes system information, link information, interface information, link relationship information, and hosted interface information recorded in system object 412A, link object 414A, interface object 424A, link relationship object 416A, and hosted interface object 422A, respectively speaking. Tree information 400A also includes hosted interface information matching one or more interfaces in the interface information with the one or more nodes 14 in the system information that host the interfaces as well as link relationship information matching one or more links in the link information with one or more interfaces in the interface information that provide an endpoint for the links. Accordingly, tree information 400A may provide a snapshot representing an entire intent graph model 401A of network 2 at a first time (e.g., the time tree information 400A was created).

Continuing the example of FIG. 5, tree information 400B includes difference information including one or more changes to link information and hosted interface information contained in link object 414B and hosted interface object 422B, respectively speaking. For example, link object 414B may include the addition, deletion, or modification of one or more edges 16 at network 2 while hosted interface object 422B may include addition, deletion, or modification of hosted interfaces, such as movement or migration of an interface from one node 14 to another.

Revision module 20 may generate an intent graph model 401B for a second time (e.g., the time tree information 400B was created) by applying the difference information from in link object 414B and hosted interface object 422B in tree information 400B to the snapshot in system object 412A, link object 414A, interface object 424A, link relationship object 416A, and hosted interface object 422A of tree information 400A.

Unchanged information may be retrieved from earlier tree information 400. That is, because system information is unchanged in tree information 400B, intent graph model 401B may include system information in system object 412A of tree information 400A as shown by the broken line pointer therebetween. Likewise, for example, revision module 20 may retrieve a complete state of the system information for intent graph model 401C using system object 412A, as is also illustrated by a broken line pointer. Though described with respect to system information, other unchanged categorizes of information (in this example, interface information and link relationship information) may be similarly referenced from other tree information 400.

Tree information 400C illustrates difference information including one or more changes to hosted interface information contained in hosted interface object 422C. Tree information 400C also illustrates the use of pointers to link object 414B and system object 412A which are unchanged relative to object 400C. Revision module 20 may accordingly generate intent graph model 401C by applying the difference information in hosted interface object 422C to the earlier intent graph model 401B (e.g., the objects of tree information 400B).

In some examples, revision module 20 may generate an intent graph model 401C for a third time (e.g., the time tree information 400C was created) by sequentially applying the link object 414B and hosted interface object 422B of tree information 400B and hosted interface object 422C of tree information 400C to the system object 412A, link object 414A, interface object 424A, link relationship object 416A, and hosted interface object 422A of tree information 400A. Intent graph model 401C may accordingly include the link information changes of link object 414B of tree information 400B and system information of system object 412A of tree information 400A. Though not illustrated, intent graph model 401C generated with tree information 400C may also include the other categories of information from referenced tree information 400A, 400B that are unchanged relative to tree information 400C (in this example, interface information of interface object 424A and link relationship information of link relationship object 416A). In the example of FIG. 5, intent graph model 401C generated with tree information 400C accordingly may include the changes included in tree information 400B with the exception that changes in hosted interface object 422C may override (e.g., be applied after the changes to the hosted interface information of tree information 400B).

Tree information 400D illustrates difference information including one or more changes to system information, link information, and hosted interface information contained in system object 412D, link object 414D, and hosted interface object 422D, respectively speaking. As described above, such changes may override (e.g., be applied after, the changes in any referenced object 400). For example, relative to tree information 400D, revision module 20 may apply the changes in link object 414B and hosted interface object 422B of tree information 400B before the changes in system object 412D, link object 414D, and hosted interface object 422D of tree information 400D to generate intent graph model 401D. As another example, relative to tree information 400C, revision module 20 may apply the changes in link object 414B and hosted interface object 422B of tree information 400B before the changes in system object 412D, link object 414D, and hosted interface object 422D of tree information 400C as indicated by the pointer to tree information 400B.

Figure 6:
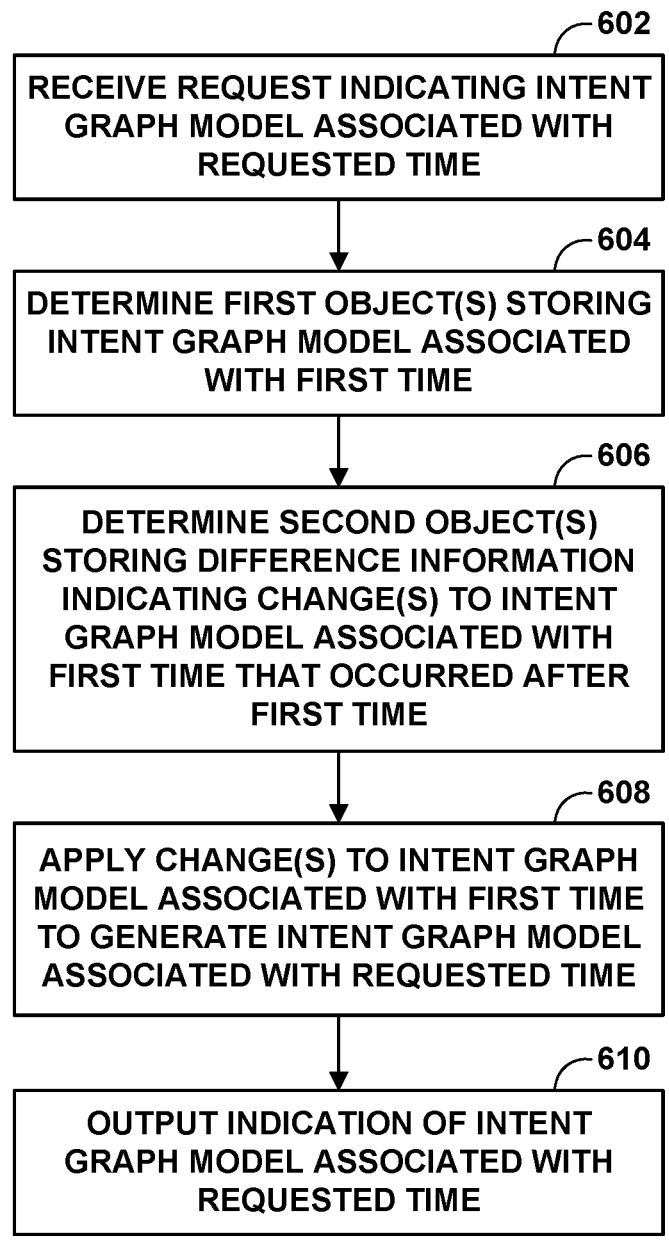
FIG. 6 is a flowchart illustrating an example process for generating an intent graph model with difference information, according to techniques of this disclosure.

FIG. 6 is a flowchart illustrating an example process for generating an intent graph model with difference information, according to the techniques of this disclosure. Controller device 10 or network management system (e.g., a user interface 36 and/or user interface module 38) may receive a request indicating an intent graph model associated with a requested time (602). The request may indicate the intent graph model network administrator 12 wishes to retrieve (e.g., the intent graph model in use and/or applied to network 2). For example, the request may specify an identifier specifying the intent graph model (e.g., using a unique identifier, such as "FC78", for the particular intent graph model or tree information for the particular intent graph model). In some examples, the request may specify the requested time, and controller device 10 may determine the intent graph model based on the requested time. For instance, controller device 10 may identify a particular intent graph model for the request in response to a determination that the particular intent graph model is deployed (e.g., network devices 14 are configured based on the particular intent graph model) at the requested time specified by the response.

Controller device 10 may determine one or more first objects storing an intent graph model associated with a first time (604) (e.g., a snapshot representing network 2 at the first time). For instance, as shown in the example of FIG. 5, the first objects may include one or more of a system object 412A, an interface object 424A, link object 414A, hosted interface object 422A, and link relationship object 416A that together include a complete state of network 2 at the first time. The first time may be different than the requested time (e.g., before the requested time). Controller device 10 may utilize timestamps of objects to retrieve objects by time. In this example the one or more first objects may have a timestamp of the first time.

In some examples, controller device 10 may obtain tree information corresponding to the requested time. Tree information may include one or more first pointers indicating the one or more first objects. Referring to the example of FIG. 5 for instance, tree information 400A includes pointers indicating one or more first objects (e.g., system object 412A, an interface object 424A, link object 414A, hosted interface object 422A, and link relationship object 416A). To retrieve the one or more first objects, controller device 10 may identify, based on the one or more first pointers, a first portion of the tree information that includes the intent graph model associated with the first time.

Controller device 10, and more specifically, for example, revision store 41, may store one or more objects representing difference information indicating one or more changes. For example, controller device 10 may determine one or more second objects storing difference information indicating one or more changes to the intent graph model associated with the first time that occurred after the first time (606). For example, controller device 10 may retrieve second objects comprising link object 414B and hosted interface object 422B which store difference information as described above with respect to the example of FIG. 5. In some examples, the one or more changes may have occurred after the first time and no later than the requested time.

Tree information may include one or more second pointers indicating the one or more second objects. To retrieve the one or more second objects, controller device 10 may identify, based on the one or more second pointers, a second portion of the tree information that includes the intent graph model associated with the requested time. To illustrate, with respect to the example of FIG. 5, tree information 400B includes one or more second pointers to one or more second objects (e.g., link object 414B and hosted interface object 422B)

Controller device 10 may apply the one or more changes to the intent graph model associated with the first time to generate an intent graph model associated with the requested time (608). For example, controller device 10 may apply the changes recorded in one or more second objects to the snapshot of one or more first objects to generate an intent graph model associated with the timestamp of the second objects. In some examples, controller device 10 may store the one or more first objects in memory 43, store the one or more second objects in the memory, modify the one or more first objects in memory 43 using the one or more second objects in memory 43 to generate the intent graph model associated with the requested time, also in memory 43.

Controller device 10 may output an indication of the intent graph model associated with the requested time (610). For example, controller device 10 may present the intent graph model of the requested time at a user interface 36 via user interface module 38. Controller device 10 may, for example, generate data for a user interface 36 configured to present the intent graph model associated with the requested time.

Additional snapshots of entire intent graph models may be stored in some examples. For example, a snapshot may be stored when an amount of data used to store difference information, exceeds a size threshold value, or when a quantity of changes exceeds a threshold value. As such, in some examples, controller device 10 may determine an amount of data used to store one or more objects storing difference information. Continuing this example, controller device 10 may generate one or more objects representing a snapshot of an intent graph model when the amount of data exceeds a size threshold value or when a quantity of changes exceeds a threshold value. For instance, to generate a snapshot, controller device 10 may generate one or more first objects including system information, interface information, link information, hosted interface information, and link relationship information capturing the state of network 2.

Though described with reference to controller device 10, in some examples, controller device 10 may perform the above operations by executing or using revision module 20.

Figure 7:
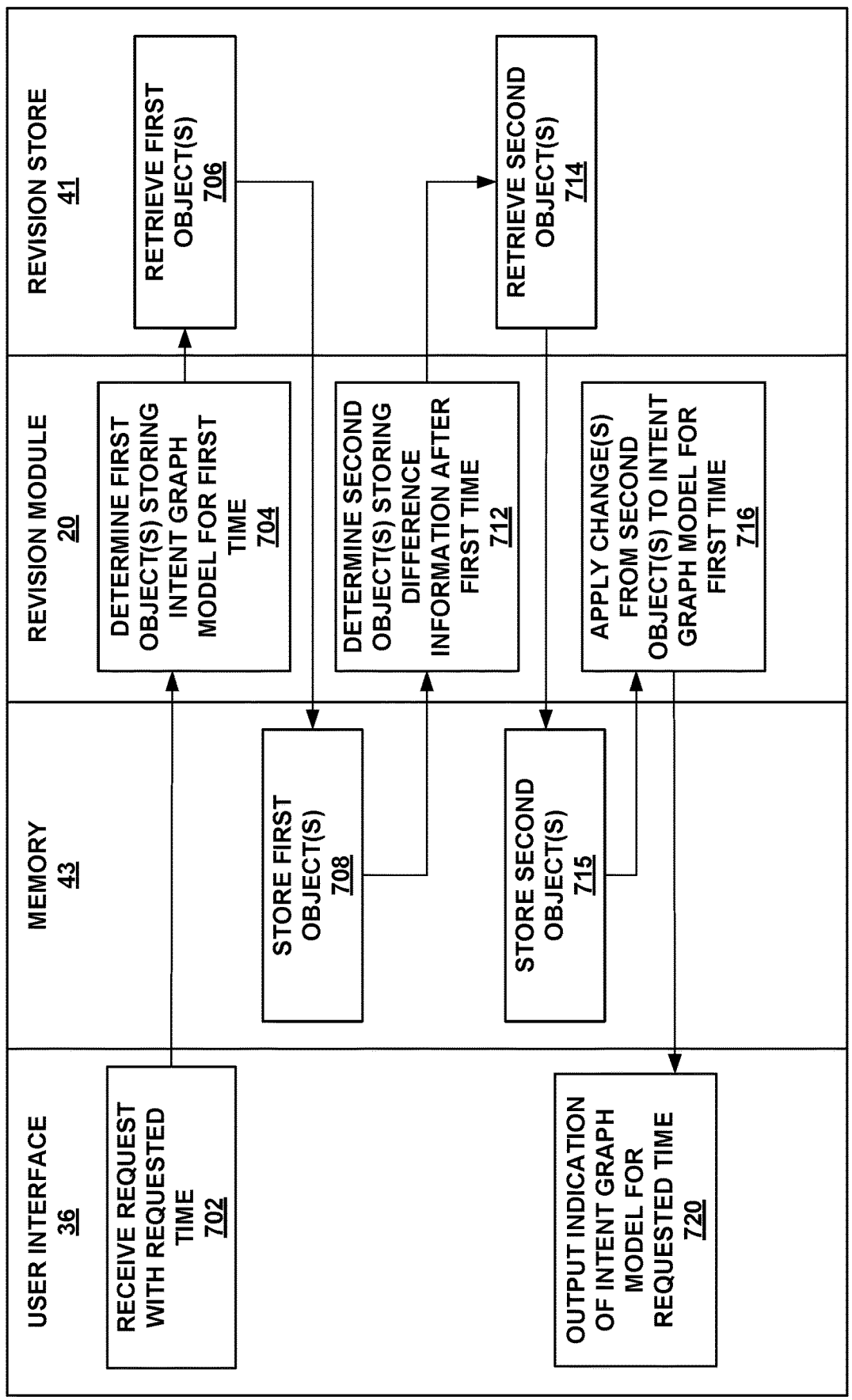
FIG. 7 is a conceptual diagram illustrating an example of intent graph model generation with difference information, according to techniques of this disclosure.

FIG. 7 is a conceptual diagram illustrating an example of intent graph model generation with difference information, in accordance with techniques of this disclosure. Controller device 10 may receive a request including a requested time or an intent graph model (e.g., identifier or tree information) through a user interface 36 (702). Revision module 20 may determine one or more first objects storing an intent graph model (e.g., snapshot) associated with a first time (704) and revision store 41 may retrieve the one or more first objects (706). The first time may be before the requested time.

For instance, controller device 10 may determine tree information assigned to a time range including the requested time for the intent graph model. The tree information may specify one or more first pointers identifying one or more objects for a closest snapshot (e.g., the most recent snapshot within the time range) for the requested time. In this example, controller device 10 may retrieve the first objects using the one or more first pointers.

Controller device 10 may include a memory 43. Memory 43 may be used to store or cache, among other things (e.g., other objects) the one or more first objects. Memory 43 may be computer-readable media. In some examples, memory 43 may be local to (e.g., integrated in) controller device 10, a network administrator's computing device (e.g., local workstation) or both. Local memory 43 may be advantageous in that local memory may be used to cache one or more objects, such as the one or more first objects, locally to reduce latency and improve system responsiveness. Objects stored or cached in memory 43 may be retrieved only once (e.g., controller device 10 may refrain from retrieving objects once stored in memory 43).

For example, controller device 10 may retrieve an object (e.g., an object including system information for a first intent graph model) and store the object in memory 43. In this example, when using the object again in generating a second intent graph model, controller device 10 may refrain from retrieving the object from revision store 41 a second time and instead use the object previously stored in memory 43 for the first intent graph model to generate the second intent graph model. In this manner, one or more objects for a snapshot may be used repeatedly to generate or replay a plurality of intent graph models.

Revision module 20 may determine one or more second objects storing difference information including one or more changes that occurred after the first time (712). Revision store 41 may retrieve the one or more second objects (714). For example, controller device 10 may determine that the tree information assigned to a time range including the requested time for the intent graph model includes one or more second pointers specifying one or more second objects. Each one of the one or more second objects may specify a set of changes for a respective time and/or at least one of the first objects. For instance, controller device 10 may retrieve a second object specifying changes to interface information that occurred at a second time that is subsequent the first time. Controller device 10 may store the one or more second objects in memory 43 (715).

Revision module 20 may apply the one or more changes in one or more second objects to the snapshot in the one or more first objects to generate an intent graph model for the requested time (716). For example, revision module 20 may apply one or more changes (e.g., one or more additions, deletions, or modifications) to interface information in second objects to interface information stored in one or more first objects storing the snapshot. The one or more first objects and one or more second objects may remain in memory 43 during application of the changes.

User interface 36 may output an indication of the generated graph model for the requested time (720). For example, user interface 36 may present the generated intent graph model, representing a state of network 2, to a network administrator. User interface 36 may present each generated intent graph model for a set of times (e.g., replay of the state of network 2). In some examples, telemetry from one or more elements of network 2 may be applied to one or more generated intent graph models, such as to generate one or more metrics to find faults or diagnose network 2 when one or more earlier intent graph models were deployed.

In some examples, revision store 41 may retrieve a plurality of second objects including changes that occurred at distinct times. For example, tree information may include a second object with changes for a second time (e.g., occurring after the first time and before the requested time) and a second object with changes for third time (e.g., occurring after the second time and before the requested time). Controller device 10 may apply the plurality of second objects (e.g., the second objects for the second and third times) sequentially to generate an intent graph model for the requested time. When the snapshot (e.g., one or more first objects) is already stored in memory 43, the snapshot is not required to be retrieved again. In this manner, multiple units of difference information may be applied efficiently to effectuate replay of a plurality of intent graph models.

Controller device 10 may also reuse the data stored in memory 43 for outputting additional intent graph models. For example, memory 43 may already store one or more first objects. The first objects may already be stored in memory 43 as the result of responding to a previous intent graph model request. In response to determining that one or more first objects is already stored in memory 43, revision store 41 may retrieve one or more second objects including changes that occurred at a second time. Controller device 10 may apply the one or more second objects to the one or more first objects already in memory 43 to generate an intent graph model for the second time. Accordingly, steps 706 and 708 can accordingly be omitted for a subsequent request (e.g., the request for the intent graph model associated with the second time). For example, in response to determining that a particular first object is presently stored in memory 43, controller device 10 may refrain from retrieving the particular first object and refrain from repeating a storing of a duplicate copy of the particular first object in memory 43. In contrast, in response to determining that a particular first object is not presently stored in memory 43, controller device 10 may retrieve the particular first object and store a copy of the particular first object in memory 43. Refraining from retrieving and storing duplicate first objects may reduce an amount of bandwidth used by controller device 10.

As a result of responding to a previous intent graph model request, memory 43 may already store one or more second objects including changes that occurred at a second time. For a subsequent request for an intent graph model associated with a third time, revision store 41 may retrieve one or more second objects including changes that occurred at the third time. Controller device 10 may apply the second objects including changes that occurred at the third time to the second objects including changes that occurred at the second time that are already stored in memory 43. Accordingly, steps 714 and 715 can accordingly be omitted when responding to the subsequent request. For example, in response to determining that a particular second object is presently stored in memory 43, controller device 10 may refrain from retrieving the particular second object and refrain from repeating a storing of a duplicate copy of the particular second object in memory 43. In contrast, in response to determining that a particular second object is not presently stored in memory 43, controller device 10 may retrieve the particular second object and store a copy of the particular second object in memory 43. Refraining from retrieving and storing duplicate second objects may reduce an amount of bandwidth used by controller device 10.

In some examples, controller device 10 may determine if one or more objects (e.g., one or more first objects and/or one or more second objects) are already stored in memory 43, such as from tree information, and accordingly refrain from executing steps 706 and 708, steps 714 and 715, or both.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method (e.g., when the instructions are executed). Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A system for network management comprising:
   computer-readable media configured to store a plurality of objects representing a plurality of intent graph models of a network; and
   processing circuitry coupled to the computer-readable media, wherein the processing circuitry is configured to:
   based on an amount of change to the network prior to a first time exceeding a threshold value, generate one or more first objects of the plurality of objects, the one or more first objects storing an intent graph model associated with the first time;
   receive a request indicating an intent graph model associated with a requested time;
   determine the one or more first objects of the plurality of objects, the first time different from the requested time;
   determine one or more second objects of the plurality of objects, the one or more second objects storing difference information indicating one or more changes to the intent graph model associated with the first time that occurred after the first time;
   apply the one or more changes to the intent graph model associated with the first time to generate the intent graph model associated with the requested time; and
   output an indication of the intent graph model associated with the requested time.

2. The system of claim 1, wherein to output the indication, the processing circuitry is configured to generate data for a user interface configured to present the intent graph model associated with the requested time.

3. The system of claim 1, wherein the one or more changes occur one or more times after the first time and at or before the requested time.

4. The system of claim 1, wherein the plurality of objects store at least one of system information describing one or more nodes of the network or interface information describing one or more interfaces of the network.

5. The system of claim 4, wherein a first object of the one or more first objects stores the system information and a second object of the one or more first objects stores the interface information.

6. The system of claim 4, wherein the one or more first objects store interface information and the one or more changes specify a change to the interface information stored by the one or more first objects.

7. The system of claim 1, wherein the processing circuitry is further configured to:
   obtain tree information corresponding to the requested time, the tree information comprising one or more first pointers indicating the one or more first objects and one or more second pointers indicating the one or more second objects;
   wherein to determine the one or more first objects, the processing circuitry is configured to determine, based on the one or more first pointers, a first portion of the tree information that includes the intent graph model associated with the first time; and
   wherein to determine the one or more second objects, the processing circuitry is configured to determine, based on the one or more second pointers, a second portion of the tree information that includes the one or more changes.

8. The system of claim 1, wherein the processing circuitry is further configured to:
- store, using one or more third objects, a previous intent graph model associated with a previous time that occurs prior to the first time;
- store, using one or more fourth objects, difference information indicating one or more second changes to the previous intent graph model that occurred after the previous time and no later than the first time; and
- determine an amount of data used to store the one or more fourth objects, wherein the amount of data represents the amount of change and a size of the amount of data exceeds the threshold value.

9. The system of claim 1, wherein a quantity of a plurality of changes in a subset of the plurality of objects represents the amount of change and exceeds the threshold value, the subset excluding the one or more first objects and the one or more second objects.

10. The system of claim 1, wherein the one or more changes comprises a change to one or more of:
- a node in the network; or
- a link in the network.

11. The system of claim 1, further comprising memory, wherein to apply the one or more changes the processing circuitry is further configured to:
- store the one or more first objects in the memory;
- store the one or more second objects in the memory; and
- modify the one or more first objects in the memory using the one or more second objects in the memory to generate the intent graph model associated with the requested time in the memory.

12. The system of claim 11, wherein the processing circuitry is further configured to:
- determine one or more third objects storing difference information indicating one or more additional changes to the intent graph model associated with the first time that occurred at a second time after the one or more changes and before the requested time;
- apply the one or more additional changes to the intent graph model associated with the first time to generate an intent graph model associated with the second time; and
- output an indication of the intent graph model associated with the second time.

13. A method for network management comprising:
- based on an amount of change to a network prior to a first time exceeding a threshold value, generating, by processing circuitry, one or more first objects of a plurality of objects representing a plurality of intent graph models of the network, the one or more first objects storing an intent graph model associated with the first time;
- receiving, by the processing circuitry, a request indicating an intent graph model associated with a requested time;
- determining, by the processing circuitry, the one or more first objects of a plurality of objects, the first time different from the requested time;
- determining, by the processing circuitry, one or more second objects of the plurality of objects, the one or more second objects storing difference information indicating one or more changes to the intent graph model associated with the first time that occurred after the first time;
- applying, by the processing circuitry, the one or more changes to the intent graph model associated with the first time to generate the intent graph model associated with the requested time; and
- outputting, by the processing circuitry, an indication of the intent graph model associated with the requested time.

14. The method of claim 13, wherein outputting the indication comprises generating data for a user interface configured to present the intent graph model associated with the requested time.

15. The method of claim 13, wherein the one or more changes occur one or more times are after the first time and at or before the requested time.

16. The method of claim 13, wherein the plurality of objects store at least one of system information describing one or more nodes of the network or interface information describing one or more interfaces of the network.

17. The method of claim 16, wherein the one or more first objects of the plurality of objects store interface information and the one or more changes specify a change to the interface information stored by the one or more first objects.

18. The method of claim 13, further comprising:
- obtaining, by the processing circuitry, tree information corresponding to the requested time, the tree information comprising one or more first pointers indicating the one or more first objects and one or more second pointers indicating the one or more second objects;
- wherein determining the one or more first objects comprises determining, based on the one or more first pointers, a first portion of the tree information that includes the intent graph model associated with the first time; and
- wherein determining the one or more second objects comprises determining, based on the one or more second pointers, a second portion of the tree information that includes the one or more changes.

19. The method of claim 13, further comprising
- determining, by the processing circuitry, one or more third objects storing difference information indicating one or more additional changes to the intent graph model associated with the first time that occurred at a second time after the one or more changes and before the requested time;
- applying, by the processing circuitry, the one or more additional changes to the intent graph model associated with the first time to generate an intent graph model associated with the second time; and
- outputting, by the processing circuitry, an indication of the intent graph model associated with the second time.

20. Non-transitory computer-readable storage media storing instructions that, when executed, cause processing circuitry of a network management system to:
- based on an amount of change to a network prior to a first time exceeding a threshold value, generate one or more first objects of a plurality of objects representing a plurality of intent graph models of the network, the one or more first objects storing an intent graph model associated with the first time;
- receive a request indicating an intent graph model associated with a requested time;
- determine the one or more first objects of a plurality of objects, the first time different from the requested time;
- determine one or more second objects of the plurality of objects, the one or more second objects storing difference information indicating one or more changes to the intent graph model associated with the first time that occurred after the first time;

apply the one or more changes to the intent graph model associated with the first time to generate the intent graph model associated with the requested time; and output an indication of the intent graph model associated with the requested time.

\* \* \* \* \*